United States Patent [19]

Manabe et al.

[11] Patent Number: 5,292,826
[45] Date of Patent: Mar. 8, 1994

[54] PROCESS FOR LOWERING IODINE VALUE OF RESIN

[75] Inventors: Yoshiteru Manabe, Osaka; Kiyoshi Sato, Sakai; Toshihiko Izumi, Osaka, all of Japan

[73] Assignee: Arakawa Kagaku Kogyo Kabushiki Kaisha, Osaka, Japan

[21] Appl. No.: 36,549

[22] Filed: Mar. 24, 1993

[30] Foreign Application Priority Data

Apr. 6, 1992 [JP] Japan .................................. 4-083691

[51] Int. Cl.$^5$ ................................................ C08F 4/14
[52] U.S. Cl. ...................................... 525/371; 525/339; 528/485
[58] Field of Search ................. 525/371, 339; 528/485

[56] References Cited

U.S. PATENT DOCUMENTS 4,704,427 11/1987 Kitahera et al. ..................... 525/371

FOREIGN PATENT DOCUMENTS 1300242 7/1969 Fed. Rep. of Germany ...... 525/371
1926676 11/1970 Fed. Rep. of Germany ...... 525/371
0117202 2/1953 U.S.S.R. .............................. 525/371

*Primary Examiner*—Vasu S. Jagannathan
*Attorney, Agent, or Firm*—Varndell Legal Group

[57] ABSTRACT

A process for preparing a resin having a low iodine value, comprising treating a resin having a residual unsaturated bond with a cationic polymerization catalyst. According to the process, a resin in which residual unsaturated bonds are decreased can be prepared, and the obtained resin having a low iodine value can be suitably used as raw materials for flame retarders, adhesives and the like.

13 Claims, No Drawings

PROCESS FOR LOWERING IODINE VALUE OF RESIN

BACKGROUND OF THE INVENTION

The present invention relates to a process for preparing a resin having a low iodine value, and more particularly to a process for preparing a resin having a low iodine value, in which residual unsaturated bonds, which cause the coloring or deterioration of weatherability of the resin, are decreased, and which can be suitably used as, for instance, raw materials for flame retarders, adhesives and the like.

Conventionally, flame retarders have been prepared by reacting various resins (polymers) with a halogen-containing compound such as a bromine-containing compound. However, these resins (polymers) usually have residual unsaturated bonds in its molecule. Therefore, when the resins are reacted with the halogen-containing compound, there is a defect that an obtained resin is colored or weatherability of the resin deteriorates. Accordingly, after the residual unsaturated bonds in the resin are saturated, that is, an iodine value of the resin is lowered, the resin is reacted with the halogen-containing compound to use as a flame retarder.

As a method for lowering the iodine value of the above-mentioned resin, for instance, a process comprising adding hydrogen to the residual unsaturated bonds in the resin, and the like are cited. However, this process usually necessitates a complicated process under pressure and there occurs a problem that a huge investment in plants and equipments and running cost are required.

An object of the present invention is to provide a resin which is not colored and has excellent weatherability.

Another object of the present invention is to provide a resin which can be preferably used as a raw material for flame retarders, adhesives and the like.

A further object of the present invention is to provide a process which can easily and economically decrease the iodine value of a resin without a complicated process.

These and other objects of the present invention will become apparent from the description hereinafter.

SUMMARY OF THE INVENTION

The present invention has attempted in consideration of the above-mentioned prior art.

In accordance with the present invention, there is provided a process for preparing a resin having a low iodine value, comprising treating a resin having a residual unsaturated bond in its molecule with a cationic polymerization catalyst.

DETAILED DESCRIPTION

The process for preparing a resin having a low iodine value of the present invention, is characterized by treating a resin having a residual unsaturated bond, particularly a residual unsaturated double bond in its molecule with a cationic polymerization catalyst.

As mentioned above, in the conventional processes, a complicated process is required for adding hydrogen to residual unsaturated bonds of the resin.

On the other hand, in the present invention, the cationic polymerization catalyst is used, and the unsaturated bonds can be easily decreased by treating with the cationic polymerization catalyst.

As the resin having a residual unsaturated bond, used in the process of the present invention, there can be cited various polymers or copolymers which are obtained by polymerizing, for instance, one or more of various known monomers in accordance with a known polymerizing method such as a radical polymerization, anionic polymerization or cationic polymerization method. As these monomers, there can be cited, for instance, aromatic monomers such as styrene, vinyltoluene and α-methylstyrene; α-olefin monomers having 3 to 22 carbon atoms such as 1-decene, 1-hexene and 1-dodecene; (meth)acrylic acid esters such as methyl (meth)acrylate, ethyl (meth)acrylate and butyl (meth)acrylate; and the like. Among them, as a resin the iodine value of which can be particularly easily lowered, a resin obtained by polymerizing the aromatic monomer can be cited.

In the present invention, the weight average molecular weight of these resins is not particularly limited.

The above-mentioned resin having a residual unsaturated bond can be treated with the cationic polymerization catalyst, by melting the resin in the absence of a solvent, or by dissolving the resin in a solvent.

The above-mentioned solvent is not limited in the present invention, and various solvents which can dissolve the resins can be used. Among the solvents, aromatic solvents such as benzene, toluene and xylene can be particularly preferably used in the present invention because the iodine value of the resin can be remarkably lowered.

The amount of the solvent can be suitably determined depending upon the kind and the amount of the used resin. The amount of the solvent can be generally the amount which is sufficient for dissolving the resin.

As is clear from the above, it is preferable in the present invention that a resin having an aromatic ring, which is obtained by polymerizing the aromatic monomer, is used, or that the resin which is dissolved in an aromatic solvent is used.

The cationic polymerization catalyst is not particularly limited in the present invention. Examples of the cationic polymerization catalyst are, for instance, proton acids such as sulfuric acid, trichloroacetic acid, phosphoric acid and perchloric acid; Lewis acids (Friedel-Crafts type catalyst) such as boron trifluoride, aluminum trichloride, titanium tetrachloride and tin tetrachloride; materials from which a cation can be easily generated such as iodine, an ion exchange resin and triphenyl chloromethane; materials obtained by supporting the above-mentioned materials from which a cation can be easily generated on silicon dioxide, aluminum oxide or the like; a material obtained by the acid treatment of acid clay such as activated clay; and the like. Among them, activated clay is particularly preferable from the viewpoint of effective decreasing of the residual unsaturated bonds and ease of handling.

The amount of the above-mentioned cationic polymerization catalyst can be suitably determined according to its catalitic activity, the temperature at which the resin is treated with the catalyst and the amount of the unsaturated bonds of the used resin. It is generally preferable that the amount of the cationic polymerization catalyst is 0.001 to 10 parts (parts by weight, hereinafter referred to the same), particularly 0.01 to 5 parts based upon 100 parts of the resin. When the amount of the catalyst is less than 0.001 parts, there is a tendency that the catalytic activity becomes insufficient and the iodine value of the resin is not sufficiently lowered within a reasonable reaction time. When the amount of the catalyst is more than 10 parts, there is a tendency that the cost rises, thereby the process becomes uneconomical.

When the above-mentioned resin having a residual unsaturated bond is treated with the cationic polymerization catalyst, if necessary, the reaction can be carried out with stirring so that the catalyst and the resin can be uniformly mixed.

The temperature at which the resin having a residual unsaturated bond is treated with the cationic polymerization catalyst is depending upon the kind and the amount of the used catalyst. The temperature is not particularly limited so long as the resin itself shows flowability, or the resin shows flowability in a state that the resin is dissolved in a solvent. The temperature can be selected from a wide range. The time for treating the resin with the catalyst is not particularly limited so long as the time is sufficient for treating with the above-mentioned catalyst so that the residual unsaturated bonds of the above-mentioned resin can be decreased.

In the process of the present invention, although function of the cationic polymerization catalyst for the resin having a residual unsaturated bond is not clear in detail, it is thought that the catalyst probably acts as a catalyst of a Friedel-Craft type reaction. It is thought that, for instance, when the resin obtained by polymerizing an aromatic monomer is used, an intramolecular reaction is carried out, and that when the resin is dissolved in the aromatic solvent, the resin reacts with the solvent. Further, it is thought that when the resin obtained by polymerizing an aromatic monomer is used and the resin is dissolved in the aromatic solvent, an intramolecular reaction is carried out in the resin and the resin also reacts with the solvent.

In the process of the present invention, a resin having a low iodine value, in which the iodine value is lowered, can be easily obtained. Since this resin has a low iodine value, the resin is not colored by reacting with the halogen-containing compound and the resin shows excellent weatherability. Therefore, the resin can be preferably used as, for instance, a flame retarder and the like, and the resin can be applied to the conventional uses such as a component of adhesives and rubbers.

The present invention is more specifically described and explained by means of the following Examples. It is to be understood that the present invention is not limited to the Examples, and various changes and modifications may be made in the invention without departing from the spirit and scope thereof.

EXAMPLE 1

One hundred grams of a styrene oligomer having a softening point of 68° C. and an iodine value of 2.8 was melted at 139° C., and 0.8 g of activated clay commercially available from MIZUSAWA INDUSTRIAL CHEMICALS, LTD. under the trade name of Galleon Earth NV was added thereto. Then, the mixture was kept in warm for 2 hours. After keeping the mixture in warm, activated clay was removed therefrom to give 99 g of styrene oligomer. The obtained oligomer had a softening point of 68° C. and an iodine value of 0.33.

EXAMPLE 2

In 50 g of toluene was dissolved 50 g of a styrene oligomer having a softening point of 93° C. and an iodine value of 2.4, and 0.6 g of the same activated clay as used in Example 1 was added thereto. Then, the mixture was refluxed at 125° C. for 4 hours. After refluxing of the mixture, activated clay and toluene were removed therefrom to give 50 g of a styrene oligomer. The obtained oligomer had a softening point of 93° C. and an iodine value of 0.39.

EXAMPLE 3

The same manner as in Example 2 was repeated except that 0.1 g of aluminum trichloride was used instead of 0.6 g of activated clay to give 50 g of a styrene oligomer. The obtained oligomer had a softening point of 92° C. and an iodine value of 0.28.

EXAMPLE 4

The same manner as in Example 2 was repeated except that 1.5 g of 0.1N aqueous solution of sulfuric acid was used instead of 0.6 g of activated clay to give 50 g of a styrene oligomer. The obtained oligomer had a softening point of 93° C. and an iodine value of 0.53.

EXAMPLE 5

The same manner as in Example 2 was repeated except that 50 g of a styrene-vinyltoluene oligomer having a softening point of 56° C. and an iodine value of 5.9 was used instead of 50 g of a styrene oligomer to give 50 g of a styrene-vinyltoluene oligomer. The obtained oligomer had a softening point of 56° C. and an iodine value of 0.49.

EXAMPLE 6

In 50 g of benzene was dissolved 25 g of polymethyl methacrylate having a weight average molecular weight of 12,000 and an iodine value of 1.2, which is a reagent commercially available from Aldrich Chemical Company Inc., and 0.2 g of titanium tetrachloride was added thereto. Then, the mixture was refluxed at 95° C. for 6 hours. After refluxing of the mixture, titanium tetrachloride and benzene were removed therefrom to give 25 g of polymethyl methacrylate. The obtained resin had an iodine value of 0.55.

As is clear from the results shown in Examples 1 to 6, it is understood that in the present invention, the iodine value of the resin having a residual unsaturated double bond can be decreased by a very simple treatment comprising treating the resin having a residual unsaturated double bond with a cationic polymerization catalyst.

In accordance with the process for preparing a resin having a low iodine value of the present invention, which is a cheap and easy process, a resin having a low iodine value in which residual unsaturated bonds are decreased can be easily prepared. Moreover, since the obtained resin has a low iodine value, the resin is not colored when the resin is reacted with a halogen-containing compound and also the resin shows excellent weatherability. Therefore, the resin can be suitably used as raw materials for flame retarders, adhesives and the like.

In addition to the ingredients used in the Examples, other ingredients can be used in the Examples as set forth in the specification to obtain substantially the same results.

What is claimed is:

1. A process for preparing a resin having a low iodine value, comprising treating a resin having a residual unsaturated bond in its molecule with a cationic polymerization catalyst, said resin obtained by polymerizing at least one of an aromatic monomer, and α-olefin having 3 to 22 carbon atoms and a (meth)acrylic acid ester.

2. The process of claim 1, comprising the steps of dissolving said resin having a residual unsaturated bond in a solvent and then reacting the resin having a residual unsaturated bond with said cationic polymerization catalyst.

3. The process of claim 2, wherein said solvent is an aromatic solvent.

4. The process of claim 1, comprising the steps of melting said resin having a residual unsaturated bond in the absence of a solvent and then treating the resin with said cationic polymerization catalyst.

5. The process of claim 2, wherein said solvent is an aromatic solvent.

6. The process of claim 1, wherein said residual unsaturated bond is a residual unsaturated double bond.

7. The process of claim 1, wherein said resin having a residual unsaturated bond is a resin obtained by polymerizing at least one of styrene, vinyltoluene, α-methylstyrene, 1-decene, 1-hexene, 1-dodecene, methyl (meth)acrylate, ethyl (meth)acrylate and butyl (meth)acryalte.

8. The process of claim 1, wherein said cationic polymerization catalyst is a proton acid, a Lewis acid, a material from which a cation is generated during use in a process, a material obtained by supporting a material from which a cation is generated during use in a process on silicon dioxide or aluminum oxide, or a material obtained by the acid treatment of acid clay.

9. The process of claim 1, wherein the amount of said cationic polymerization catalyst is 0.001 to 10 parts by weight based upon 100 parts by weight of said resin having a residual unsaturated bond.

10. The process of claim 1, wherein the amount of said cationic polymerization catalyst is 0.01 to 5 parts by weight based upon 100 parts by weight of said resin having a residual unsaturated bond.

11. A flame retarder having excellent weatherability, comprising a resin whose iodine value is lowered by the process of claim 1.

12. A process for decreasing an iodine value of a resin having a residual unsaturated bond and obtained by polymerizing at least one of an aromatic monomer, an α-olefin having 3 to 22 carbon atoms and a (meth)acrylic acid ester, which comprises treating said resin with a cationic polymerization catalyst and lowering said iodine value of said resin, wherein the resulting resin with a lower iodine value is not colored by reaction with a halogen-containing compound.

13. The process of claim 12, wherein said resulting resin has excellent weatherability and is useful as a flame retarder.

* * * * *